(12) United States Patent
Gauthier et al.

(10) Patent No.: US 9,844,899 B2
(45) Date of Patent: Dec. 19, 2017

(54) HANDLE FOR A TOOL

(71) Applicant: Gauthier Biomedical, Inc., Grafton, WI (US)

(72) Inventors: Michael T. Gauthier, Grafton, WI (US); Steven S. Landowski, Random Lake, WI (US)

(73) Assignee: Gauthier Biomedical, Inc., Grafton, WI (US)

(*) Notice: Subject to any disclaimer, the term of this patent is extended or adjusted under 35 U.S.C. 154(b) by 404 days.

(21) Appl. No.: 14/168,600

(22) Filed: Jan. 30, 2014

(65) Prior Publication Data

US 2014/0165799 A1   Jun. 19, 2014

Related U.S. Application Data

(63) Continuation of application No. 12/538,439, filed on Aug. 10, 2009, now Pat. No. 8,641,955.

(60) Provisional application No. 61/087,365, filed on Aug. 8, 2008.

(51) Int. Cl.
| | |
|---|---|
| *B29C 45/00* | (2006.01) |
| *B25G 1/10* | (2006.01) |
| *B29C 45/14* | (2006.01) |
| *B29C 45/16* | (2006.01) |

(52) U.S. Cl.
CPC ............ *B29C 45/0062* (2013.01); *B25G 1/10* (2013.01); *B25G 1/102* (2013.01); *B29C 45/006* (2013.01); *B29C 45/14549* (2013.01); *B29C 45/1671* (2013.01); *B29C 45/1676* (2013.01); *Y10T 16/44* (2015.01)

(58) Field of Classification Search
None
See application file for complete search history.

(56) References Cited

U.S. PATENT DOCUMENTS

| | | | |
|---|---|---|---|
| 2,298,365 A | 10/1942 | Gits et al. | |
| 2,985,209 A * | 5/1961 | Novelo | B25G 1/105 81/177.1 |
| 4,495,130 A | 1/1985 | Hedrick | |
| 5,390,572 A | 2/1995 | Gakhar et al. | |
| 5,882,567 A | 3/1999 | Cavallaro et al. | |
| 5,964,009 A * | 10/1999 | Hoepfl | B25G 1/105 16/430 |
| 6,183,681 B1 | 2/2001 | Sullivan et al. | |

(Continued)

*Primary Examiner* — Edmund Lee
(74) *Attorney, Agent, or Firm* — Boyle Fredrickson, S.C.

(57) ABSTRACT

A process for producing molded products having portions formed with two separate materials is provided. The process involves forming a first component over a structural core in a first step, and forming a second component that is secured to the first component and the core in a second step. The second component can be formed directly over the first component or can be secured thereto after formation. The first and second components can additionally be formed with indicia thereon, or with recesses within which inserts containing the desired indicia can be positioned. Additionally, the first component can be formed with a ridge disposed on a projection formed on the first component that effectively seals off a portion of the first component when the second component is formed around the core and the first component to ensure the portion of the first component surrounded by the ridge remains visible after formation of the second component.

4 Claims, 8 Drawing Sheets

(56) References Cited

U.S. PATENT DOCUMENTS

| | | | | |
|---|---|---|---|---|
| 6,199,460 B1* | 3/2001 | Lo | ............................ | B25G 1/10 |
| | | | | 81/177.1 |
| 6,228,306 B1* | 5/2001 | Hoepfl | .................... | B25G 1/105 |
| | | | | 264/254 |
| 6,368,536 B1* | 4/2002 | Hoepfl | .................... | B25G 1/105 |
| | | | | 264/250 |
| 9,096,004 B2* | 8/2015 | Suzuki | ................ | B29C 45/1657 |
| 2006/0026800 A1* | 2/2006 | Lawless | ................ | B25G 1/105 |
| | | | | 16/430 |
| 2009/0193600 A1* | 8/2009 | Pennell | .................... | A46B 5/02 |
| | | | | 15/143.1 |
| 2010/0117262 A1* | 5/2010 | Gringer | .............. | B29C 45/1671 |
| | | | | 264/247 |

\* cited by examiner

HANDLE FOR A TOOL

CROSS REFERENCE TO RELATED APPLICATIONS

This application claims priority as a continuation of U.S. Non-Provisional patent application Ser. No. 12/538,439, filed on Aug. 10, 2009, now U.S. Pat. No. 8,641,955, issued on Feb. 4, 2014, which in turn claims priority from U.S. Provisional Application Ser. No. 61/087,365 filed on Aug. 8, 2008, the entirety of which are each expressly incorporated by reference herein.

FIELD OF THE INVENTION

The present invention relates to molded items, such as handles for various types of tools such as tools utilized in the medical industry including torque wrenches, and, more specifically, to an item having an exterior formed from a two step molding process to provide the desired appearance and properties to the item.

BACKGROUND OF THE INVENTION

Many different types of items are formed from molded components. These components are formed in molding processes that use a desired material in fluid form that is introduced into a mold to be shaped and solidified into the desired to form the item. However, in many of these processes, the item is limited to being formed from only a single type of material, due to various constraints, including the types of material being utilized in the molding process.

In order to provide various items with improved aesthetic and utilitarian properties, many items have previously been formed from or with multiple molded components. In these items, the components are normally formed separately from one another and later mechanically interlocked with one another, or otherwise secured to one another to form the item or a portion of the item. On many occasions, the manner in which the molded components are secured to one another often provides a less than desirable appearance and/or a less durable construction, as well as increasing the overall expense for the manufacturing and assembly of the components.

In addition, in certain situations where the item having the multiple molded components is to be subjected to conditions far outside of normal environmental conditions the need for a durable item is paramount, such as in the medical field where molded items are often autoclaved to sterilize the items after use. This is because the conditions utilized to sterilize the items including the molded components can easily degrade or separate the components from one another, thereby damaging the item. In addition, should the components become separated from one another in any manner, that separation can enable various bacteria and other similar organisms to enter the separation present between the components and potentially prevent the item from being properly sterilized.

Therefore, it is desirable to develop a process for molding an item, such as a tool for use in the medical field, with multiple molded components that provides a tool with the required durability for the molded components in the item, but that also provides a clean and aesthetically pleasing appearance to the item.

SUMMARY OF THE INVENTION

According to one aspect of the present invention, the molding process involves providing a core for the item on which the various materials are to be molded. The core is positioned within a mold having the desired shape for the first molded component, and the material used to form that first component is subsequently injected, or otherwise introduced into the mold. The first component is formed with one or more structural features thereon that enable a second molded component formed of the same or a different material to be directly secured to the first component, such as in a subsequent molding process where the mold utilized in the subsequent process defines a desired configuration for the second component around the core and the first component.

According to another aspect of the present invention, because the second molded component can be affixed directly to the first molded component in a variety of different manners, such as by molding the second component directly around and/or onto the first component, the materials utilized to form the first and second components can be selected to be easily adhered or affixed to one another and to provide the desired aesthetic appearance to the item.

According to still another aspect of the present invention, the first and second components can be formed of materials having different colors, textures, and/or other properties to enhance the appearance and feel of the item formed from the first and second components. In addition, one or both of the molded components can be formed with various decorative features thereon that enable the components to more readily form the desired appearance for the item.

Numerous other aspects, features, and advantages of the present invention will be made apparent from the following detailed description together with the drawings figures.

BRIEF DESCRIPTION OF THE DRAWINGS

The drawings illustrate the best mode currently contemplated of practicing the present invention.

In the drawings.

DETAILED DESCRIPTION OF THE INVENTION

Figure 1:
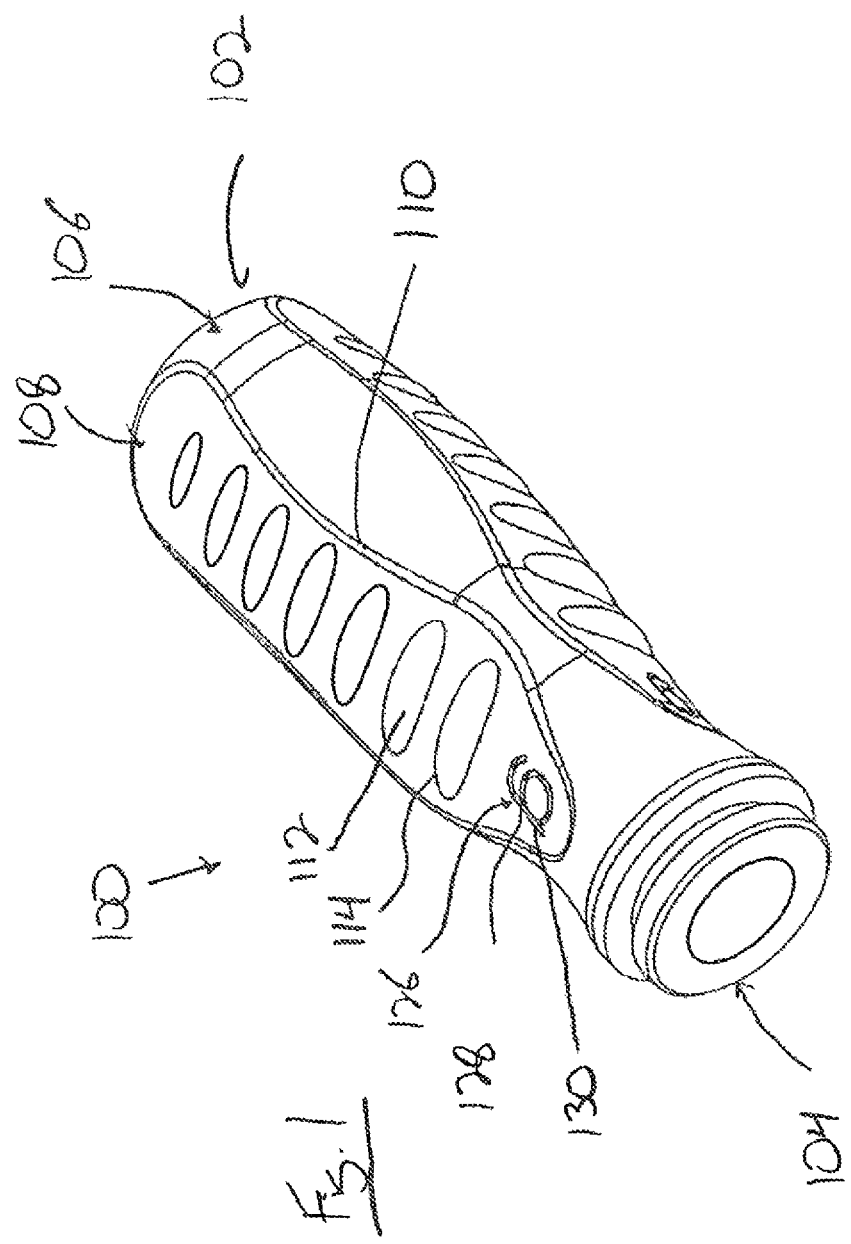
FIG. 1 is an isometric view of a first embodiment of a tool handle constructed according to the present invention.
Figure 2:
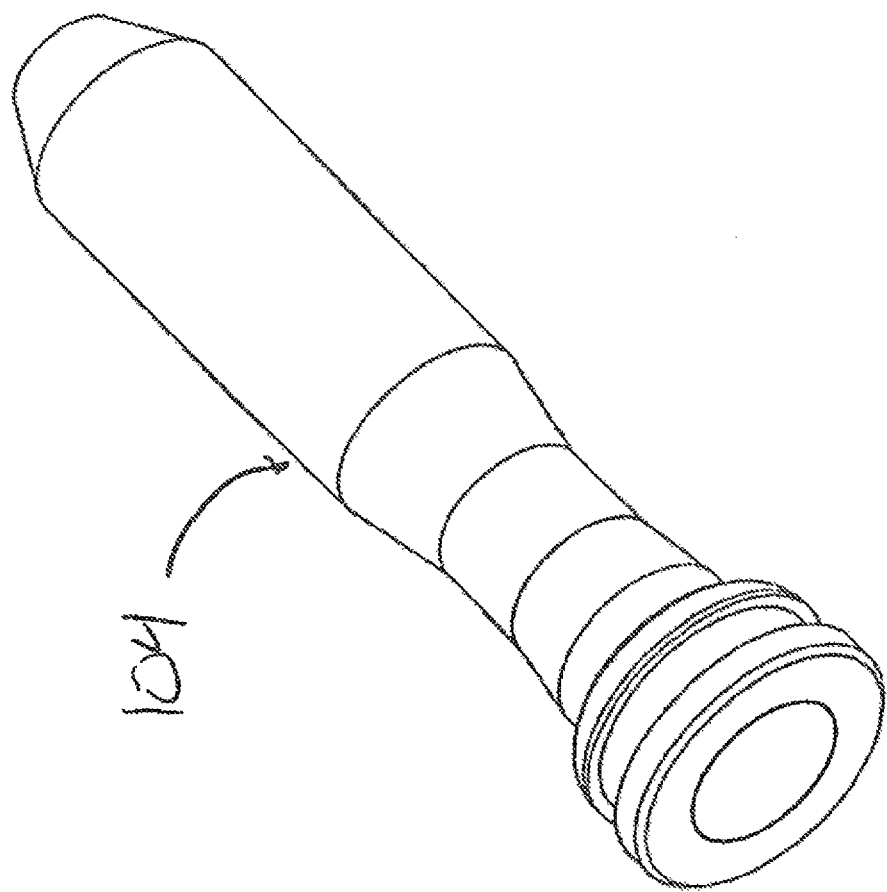
FIG. 2 is an isometric view of the core used to form the handle of FIG. 1.
Figure 3:
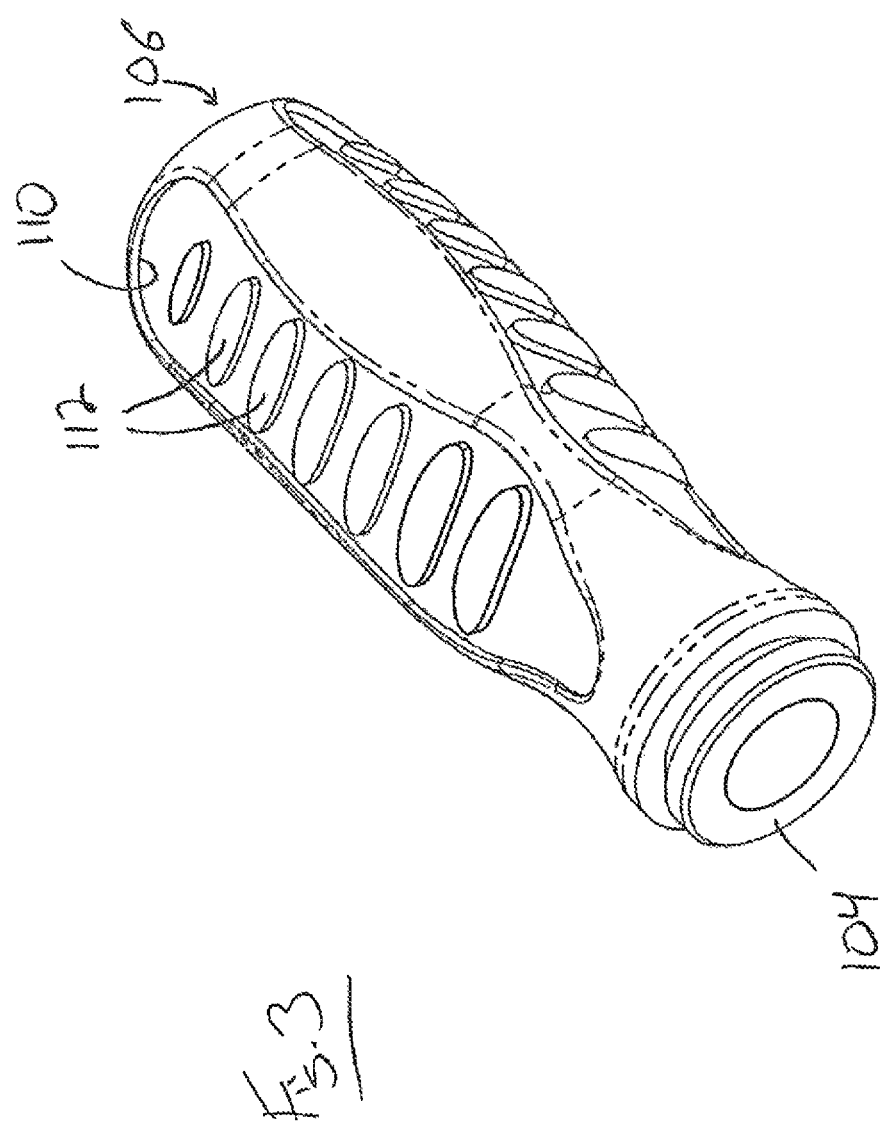
FIG. 3 is isometric view of a first component molded over the core of FIG. 2.
Figure 4:
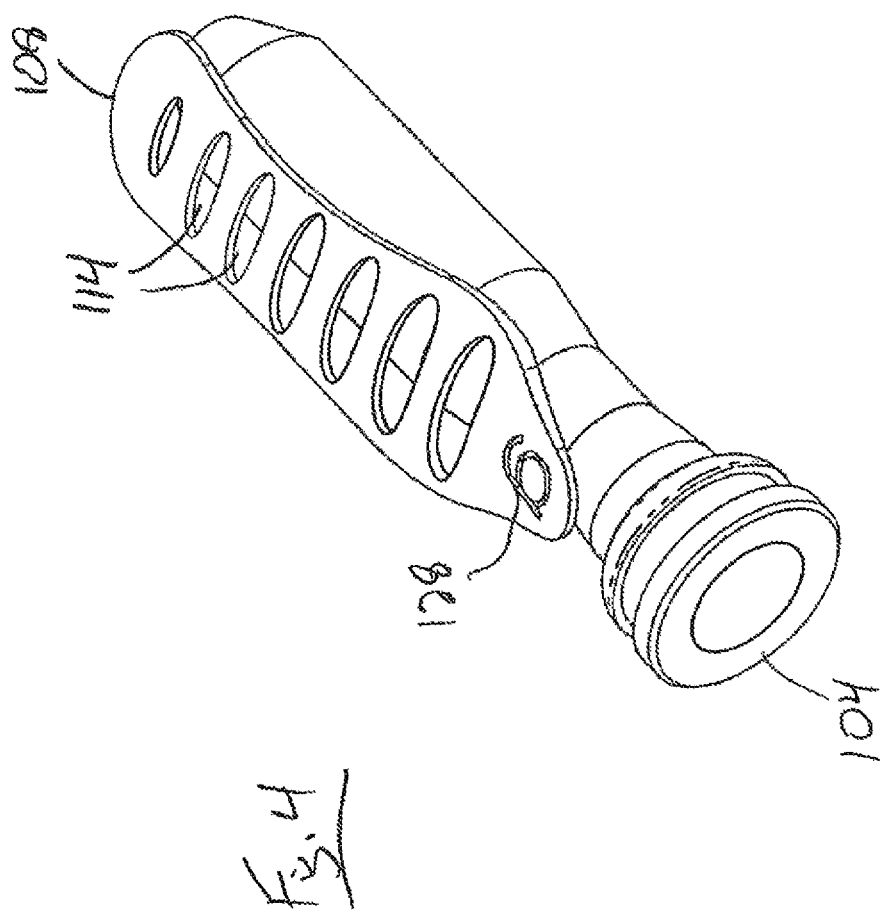
FIG. 4 is isometric view of a second molded component that is affixed to the first component of FIG. 3.

With reference now to the drawing figures in which like reference numerals designate like parts throughout the disclosure, an item constructed according to the present invention is indicated generally at 100 in FIGS. 1-4. The item 100 is formed as a handle 102 that is used to house a suitable mechanism for a tool, such as a ratcheting or torque limiting mechanism, though other types of mechanisms or the omission of any operating mechanism is also contemplated.

The handle 102 is formed with a core 104 that is formed from any desired and preferably rigid material, such as a metal or hard plastic. The core 104 has a shape corresponding to the desired usage of the item or handle 102, and thus can have any desired shape, though ergonomic shapes for use on tools utilized in the medical industry are especially preferred. This core 104 is initially positioned within a mold conforming to the desired shape of a first component 106 to be formed around the core 104.

The first component 106 is formed on the exterior of the core 104 in any suitable manner, such as in a conventional molding process, and preferably by an injection molding process. The material used to form the first component 106 can be selected based on the desired properties for the first component 106, such as resiliency, rigidity, tackiness, texture and appearance among others. The material used for the first component 106 also is selected based on its suitability for use in the particular molding process to be used. Finally, depending upon the desired aesthetic appearance for the handle 102, the material selected for use in forming the first component 106 is also selected or modified to have the desired color.

Thus, to satisfy the above requirements for the first component 106, the materials that can be utilized for the first component 106, include, but are not limited to various types of thermoplastic and/or thermoset materials, such as silicone materials, and in particular silicone rubber materials.

After the formation of the first component 106 on the core 104, the handle 102 including the core 104 and the first component 106 is removed from that initial mold so that a second component 108 can be formed on the handle 102 that is at least partially complementary in shape with respect to the first component 106.

The second component 108 is formed in a separate mold having a configuration corresponding to the shape desired for the second component 108, such as a conventional molding process, including, but not limited to injection molding. Additionally, the material or materials utilized to form the second component 108 include the same types of materials that can be used in forming the first component 106. Also, the second component 108 is preferably formed of a material having a color different than that used to form the first component 106 to enhance the aesthetic appearance of the handle 102. Further, depending upon the location and other optional purposes of the second component 108 the material or materials used to form the second component 108 can be selected to have different and/or complementary properties to the materials used to form the first component 106. For example, the first component 106 can be formed of a material or materials that are more rigid when formed in the particular molding process. In contrast, the material selected for use in forming the second component 108 can be more flexible and/or tacky when formed in the particular molding process, to provide a different tactile feel to the second component 108 in comparison to the first component 106. This tactile distinction, which can also be enhanced through the use of differently colored materials for the first component 106 an the second component 108, can provide the handle 102 with a non-visual indication of the proper location for the hand of an individual on the handle 102 when utilizing a tool or other item incorporating the handle 102. The different materials selected for use in forming the first component 106 and the second component 108 can also be selected based on other differing characteristics for the materials that provide a desired distinction on the resulting handle 102 or other item 100, such as different wear characteristics, among others.

In a first embodiment illustrated in FIGS. 1-4, the second component 108 is formed separately from the handle 102 including the core 104 and the first component 106. The second component 108 is formed of the desired material to have a shape that is directly complementary to a portion of the first component 106. Preferably, the second component 108 is formed to be an insert positioned within a recess 110 formed in the exterior of the first component 106. The recess 110 can have any desired shape and/or configuration, such as including a number of projections 112 therein, and the second component 108 is formed to be directly complementary to that shape for the recess 110, such as by having a number of apertures 114 formed therein through which the projections 112 can extend.

In this embodiment, the second component 108 is affixed within the recess 110 of the first component 106 in any suitable manner, such as by mechanically fixing the second component 108 therein, such as by frictional contact of abraded portions or engagable portions of the components 106 and 108, or by using a fastener (not shown) connected to one or both of the first component 106 and the core 104, by adhering the second component 108 to the first component 106 utilizing a suitable adhesive, or by welding the second component 108 to the first component 106, such as by thermal or sonic welding, among other suitable means for securing the second component 108 to the first component 106.

In this embodiment, there can also be more than one second component 108 secured to the first component 106, with each of the second components 108 having the same or a different configuration from one another. It is also contemplated that each of the second components 108 can be formed from multiple sections or pieces, each of which is subsequently disposed an secured within the recess 110.

Figure 5:
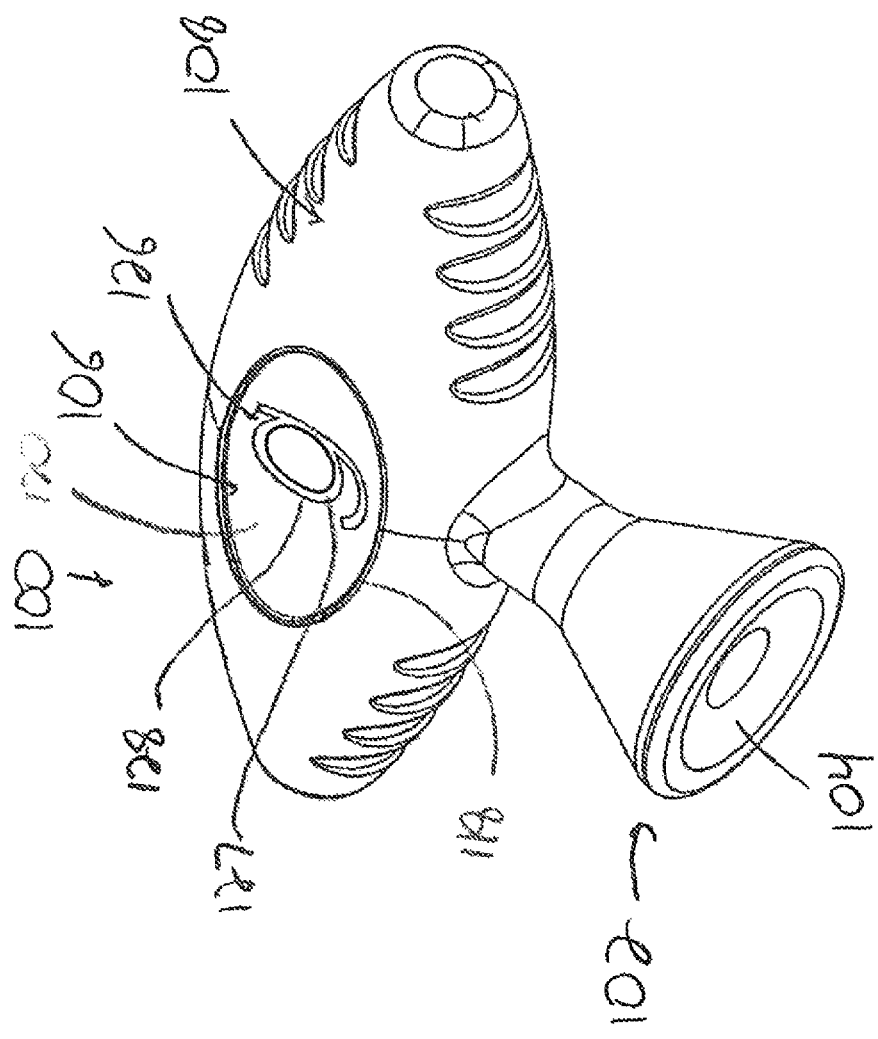
FIG. 5 is an isometric view of a second embodiment of a tool handle constructed according to the present invention.
Figure 6:
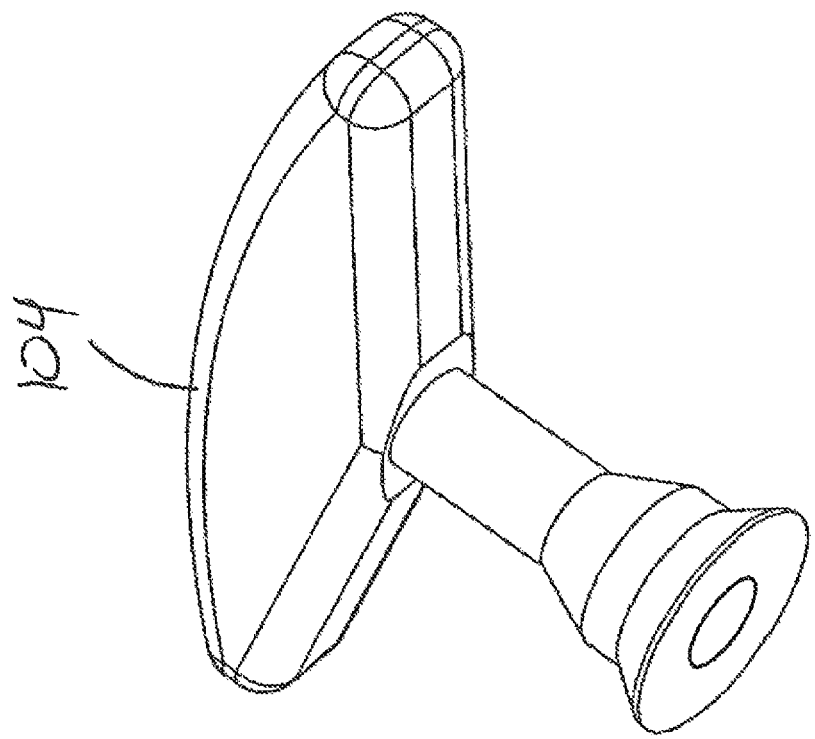
FIG. 6 is an isometric view of the core used to form the handle of FIG. 5.
Figure 7:
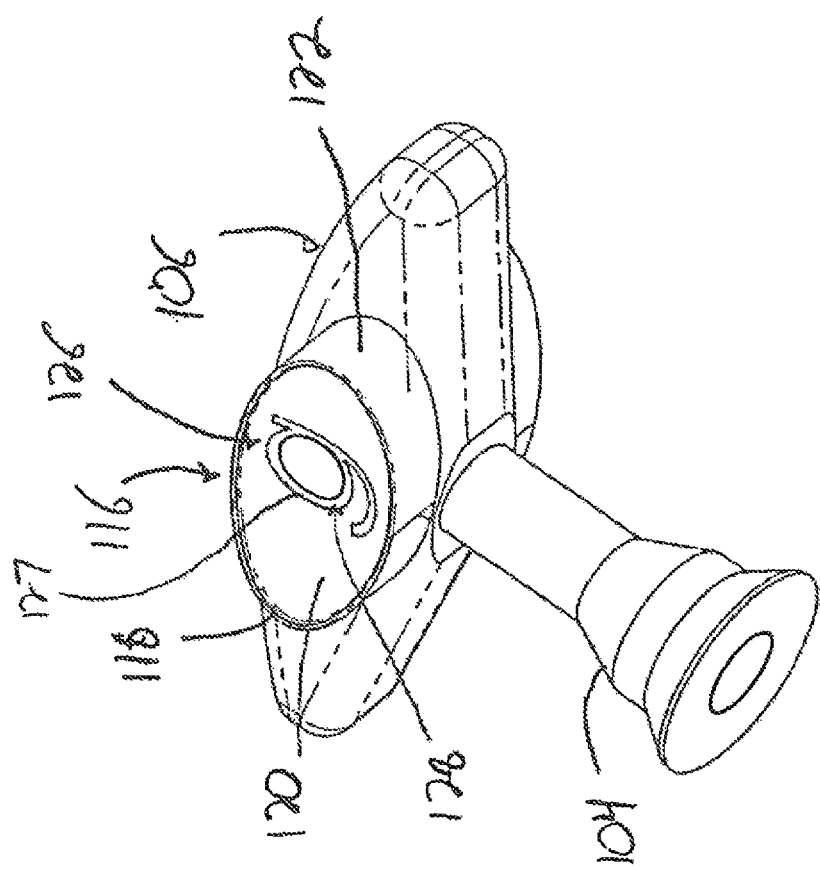
FIG. 7 is isometric view of a first component molded over the core of FIG. 6.
Figure 8:
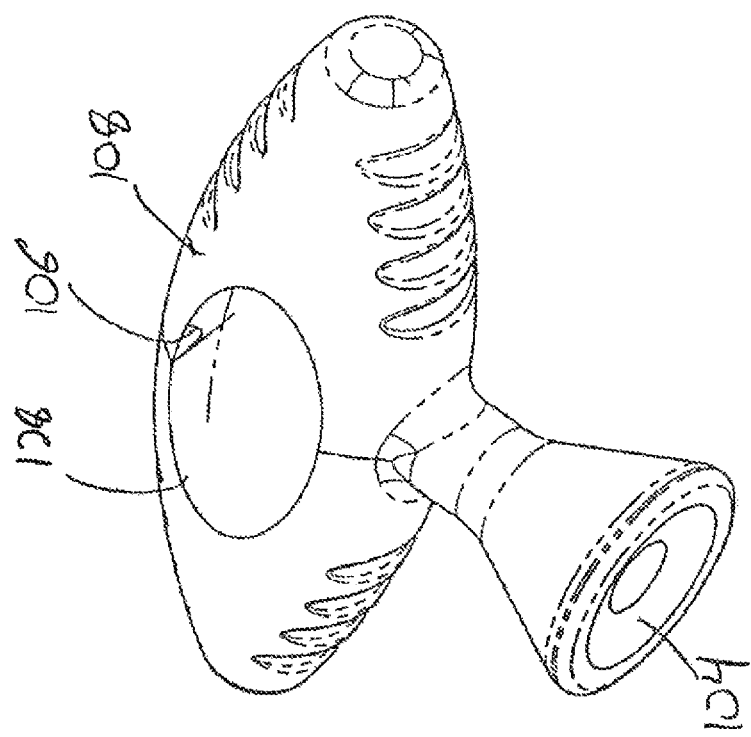
FIG. 8 is isometric view of a second molded component that is affixed to the first component of FIG. 7.

Referring now to FIGS. 5-8, in a second embodiment for the item 100, the first component 106, which is molded around the core 104 in a first mold (not shown) in the same conventional manner as described with regard to the first embodiment illustrated in FIGS. 1-4, includes a projection 116 extending outwardly from the first component 106. The projection 116 includes a ridge 118 around its periphery that separates the inner portion 120 of the projection 116 from the outer portion 122. Preferably, the ridge 118 has a configuration that enables the ridge 118 to separate the portions 120 and 122 from one another, as well as to provide a tactile locating feature on the exterior of the handle 102. After the formation of the first component 106 on the core 104, the core 104 and the first component 106 are placed in a second mold (not shown) for the forming of the second component 108 around the core 104 and the first component 106, also in any of the aforementioned conventional manners. When the second mold is closed, the ridge 118 on the projection 116 is engaged by the second mold to effectively seal off the inner portion 120 of the projection 116 from the remainder of the interior of the second mold. Therefore, when the material used to form the second component 108 is introduced into the second mold, the material is prevented from flowing into the inner portion 120 of the projection 116 in the first component 106 due to the engagement of the ridge 118 with the second mold used to define and form the second component 108. The ridge 118 can any suitable cross-sectional shape to enable it to effectively seal against the second mold, such as elliptical, oval, rectangular, square or triangular, but preferably, the ridge 118 is semicircular in cross-section, and has a radius of from 0-2 mm, with a radius of about 1 mm being especially preferred. Thus, as opposed to securing the second portion 108 to the first portion 106 as an insert within a correspondingly shaped recess 110, as in the first embodiment, in this construction and method of forming the item 100, the second component 108 is molded directly over the first component 106 while a part of the first component 106 is sealed off, such that part of the first component 106 remains visible through the second component 108. This greatly reduces the complexity of forming the first component 106, other than the projections 116, because any imperfections in the remainder of the first component 106 are effectively covered by the second component 108. Preferably, based on the requirement for the sealing capability of the ridge 118, the materials used to form the first component 106 are chosen from those able to withstand the temperatures and pressures exerted during the molding process, and that are capable of forming a solid bond with the material forming the second component 108. Particularly preferred materials are silicone rubber and similar materials.

In this second embodiment, the number of projections 116 formed on the first component 106 can be varied as necessary or desired, depending upon the shape of the item 100 and the desired appearance for the item 100.

Additionally, in each of the above embodiments, the exposed portions of each of the first component 106 and second component 108 can include indicia 126 positioned thereon or therein. The indicia 126 can be formed directly into the respective first component 106 or the second component 108 during the molding process for these components, or can be formed as a third component 127 that is inserted within a complementary recess 128 disposed in the component 106 or 108.

In the configuration where the indicia 126 are formed directly within the component 106 and/or 108, preferably the indicia 126 are formed as a raised or recessed section 130 of the component 106 and/or 108. After formation, the section 130 can be further treated, such as by painting or placing another material within the section 130 to change the appearance of the section 130 from the surrounding material forming the first component 106 or the second component 108.

In the configuration where the section 130 is formed separately from the particular component 106 and/or 108, the section 130 can be formed of any desired material with any desired color. Once formed, the section 130 can be inserted and secured within the recess 128 using any of the suitable means described previously regarding the attachment of the second component 108 to the first component 106 in the first embodiment of the invention. Additionally, the section 130 can have any desired shape, such as a fanciful design inserted into a complementary-shaped recess 128, or a more conventional polygonal or circular shape that can including a particular design therein, such that a number of sections 130 can be created with a number of different designs thereon, but each section 130 having the same exterior profile to enable the sections 130 to be interchangeable. The sections 130 can be secured within the recess 128 in any suitable manner depending upon the particular material utilized to form the sections 130, such as frictionally securing, adhering, thermally or sonically welding or molding the section 130 within the recess 128.

Alternatively, one or both of the components 106 and 108 can be formed with apertures (not shown) that expose portions of the core 104, or that enable projections (not shown) from the core 104 to extend outwardly through the various components 106 and 108 to function as further decorative features for the handle 102, or as improved gripping or other utilitarian features for the handle 102, or both.

Various other embodiments of the present invention are contemplated as being within the scope of the filed claims particularly pointing out and distinctly claiming the subject matter regarded as the invention.

The invention claimed is:

1. A handle formed using the method comprising the steps of:
 a) providing a structural core for the item;
 b) molding a first component over the core in a first mold, the first component having a projection defining at least one recess and a ridge extending outwardly from the projection and separating the at least one recess from a remainder of the first component;
 c) sealingly engaging the only the ridge with an interior of a second mold to seal off the at least one recess from the remainder of the first component; and
 d) molding a second component in the second mold, the second component directly engageable with the projection around the at least one first recess in the first component below the ridge, wherein the ridge forms a tactile locating feature on an exterior of the handle.

2. A handle formed using the method comprising the steps of:
 a) providing a structural core for the item;
 b) molding a first component over the core in a first mold, the first component having a projection defining at least one recess and a ridge extending outwardly from the projection and at least one recess and a ridge separating the at least one recess from a remainder of the first component;
 c) sealingly engaging the only the ridge with an interior of a second mold to seal off the at least one recess from the remainder of the first component; and
 d) molding a second component in the second mold, the second component directly engageable within the at least one first recess in the first component, wherein the step of molding the second component comprises molding the second component in the second mold within the at least one recess directly over the first component and the core wherein the ridge forms a tactile locating feature on an exterior of the handle.

3. A handle for a tool, the handle comprising:
 a) a core formed form a rigid material;
 b) a first component engaged with the core and including a projection extending outwardly from the first component that defines at least one recess therein and includes a ridge disposed around a periphery of the projection and extending outwardly from the projection; and
 c) a second component engaged with the first component below the ridge, the second component disposed around the projection, wherein the ridge forms a tactile locating feature on an exterior of the handle.

4. The method of claim 3 wherein the ridge is semicircular in cross-section and has a radius of between 0 mm to about 2 mm.

* * * * *

UNITED STATES PATENT AND TRADEMARK OFFICE
CERTIFICATE OF CORRECTION

PATENT NO. : 9,844,899 B2  
APPLICATION NO. : 14/168600  
DATED : December 19, 2017  
INVENTOR(S) : Michael T. Gauthier et al.

It is certified that error appears in the above-identified patent and that said Letters Patent is hereby corrected as shown below:

In the Claims

Claim 1, Column 6, Line 18, after "engaging" delete "the";

Claim 2, Column 6, Line 35, after "engaging" delete "the".

Signed and Sealed this
Tenth Day of April, 2018

Andrei Iancu
*Director of the United States Patent and Trademark Office*